United States Patent [19]
Kim et al.

[11] Patent Number: 5,804,232
[45] Date of Patent: Sep. 8, 1998

[54] PROCESS FOR PREPARING AN INSTANT RICE NECTAR

[75] Inventors: Jung-Man Kim, Pusan; Bong-Jae Lee, Yangsan-Kun; Joung-Yeoul Lee, Kimhae; Sang-Hwan Han, Pusan; Kwang-Ho Lee, Taegu, all of Rep. of Korea

[73] Assignee: Vilac Company Ltd., Pusan, Rep. of Korea

[21] Appl. No.: 536,220

[22] Filed: Sep. 29, 1995

[51] Int. Cl.$^6$ .............................. A23L 2/38; A23L 1/186; A23L 1/105
[52] U.S. Cl. .............................. 426/18; 426/29; 426/508; 426/521; 426/324; 127/38; 127/46.1; 127/67; 127/68; 127/69
[58] Field of Search ................................ 426/18, 29, 508, 426/521, 324, 325; 127/38, 46.1, 68, 67, 69

[56] References Cited

FOREIGN PATENT DOCUMENTS

| 89-3698 | 9/1989 | Rep. of Korea . |
| 89-4273 | 10/1989 | Rep. of Korea . |

OTHER PUBLICATIONS

Vilac Shikhye Rice Punch, VILAL Co, Ltd. (Product Info. from the Packaged Product), 1996.

*Primary Examiner*—Donald E. Czaja
*Assistant Examiner*—Choon P. Koh
*Attorney, Agent, or Firm*—Darby & Darby

[57] ABSTRACT

The present invention relates to a process for preparing an instant rice nectar which can be preserved for long time. The instant rice nectar of the invention is prepared by the process which comprises the steps of: adding water to malt while stirring, filtrating to obtain malt extract, adding starch hydrolase to the malt extract and saccharifying, heating and chilling, filtering, and adding sugar to the filtrate so that the total sugar content reaches Brix 32 to 68; steeping nonglutinous rice in water and boiling, adding 1 to 3 times of water by weight and starch hydrolase to the resulting nectaring rice, and saccharifying; diluting the malt extract with water saccharified nectaring rice to the resulting mixture, and filling up a container with rice nectar thus produced and sealing; and, putting the container filled with the rice nectar in a retort chamber and sterilizing. The present invention provides a novel process for preparing an instant rice nectar in a massive manner, in which the process is greatly simplified by raising the efficiency of saccharifying malt extract and nectaring rice. The instant rice nectar of the invention can be preserved for a long time, while maintaining its own delicious taste and characteristic flavor.

2 Claims, 1 Drawing Sheet

PROCESS FOR PREPARING AN INSTANT RICE NECTAR

FIELD OF THE INVENTION

The present invention relates to a process for preparing a rice nectar, more specifically, a process for preparing an instant rice nectar that can be preserved for a long time.

BACKGROUND OF THE INVENTION

Shikhye, a Korean traditional beverage of delicious taste and characteristic flavor, is a rice nectar which has been conventionally prepared by a series of processes, i.e., steeping malt in warm water of a temperature between 30° and 40° C. for 1 or 2 hours and extracting malt solution for 1 or 2 hours, adding nectaring rice to the malt solution and saccharifying for 4 to 6 hours, and boiling and chilling.

However, said conventional process for preparing Shikhye, has been proven to be less satisfactory in the sense that the scale of manufacture is very restricted and it takes relatively long time to prepare the nectar, i.e., more than 10 hours.

Accordingly, many efforts have been made to develop a simple process for preparing an instant rice nectar; and, a variety of processes have been developed in the art as follows:

Korean Patent Publication No. 89-3698 discloses a process for preparing an instant rice nectar, in which the step of preparing malt solution is greatly simplified, by extracting the malt solution from malt which is contained in a heat sealable paper bag. Korean Patent Publication No. 89-4273 teaches a process for preparing an instant rice nectar, in which both malt contained in a heat sealable paper bag and dried nectaring rice are steeped in water at the same time and extracted for 4 to 6 hours, and then saccharified.

However, said prior art processes have had shortcomings that the time-consuming saccharification step of malt often deteriorates the quality of malt and the total amount of the product is very limited. Moreover, the final product thus manufactured has not been readily commercialized, since long-term preservation of the rice nectar was impossible.

Under the circumstances, the present inventors have developed a novel process for preparing an instant rice nectar, in which: saccharification of malt is greatly simplified by incubating a mixture of malt extract and nectaring rice with starch hydrolase, which raises the efficiency of saccharification while preventing deterioration of malt during the manufacturing process, and long-term preservation of the rice nectar is also guaranteed by employing a retort sterilization, thereby enabling mass production and commercialization of the instant rice nectar.

SUMMARY OF THE INVENTION

The primary object of the present invention is, therefore, to provide a process for preparing an instant rice nectar that can be preserved for a long time while preventing deterioration of malt, thereby enabling mass production and commercialization.

DETAILED DESCRIPTION OF THE INVENTION

Figure 1:
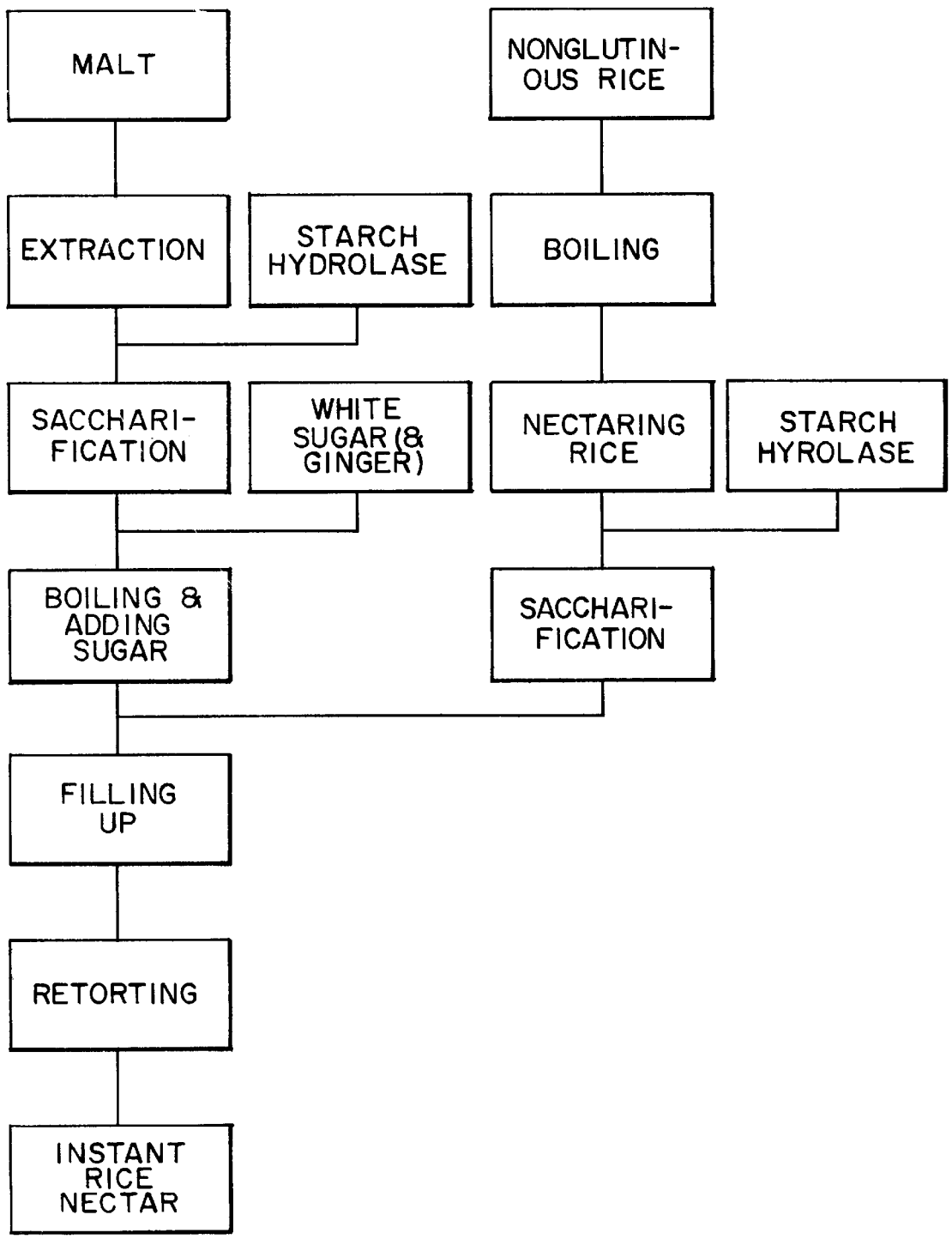
FIG. 1 depicts the process for preparing the instant rice nectar of the present invention.

The process for preparing the instant rice nectar of the invention comprises the following steps, where the weight percentage (wt %) of the employed materials is represented on the basis of the weight of the final product:

Step 1: Extraction and saccharification of malt 15 to 35 wt % of water is placed in a mixer, of which the temperature is maintained between 10° and 50° C., and malt is added to the water. The resulting mixture is subjected to stirring for 0.5 to 2 hours under the same temperature and filtrated to obtain malt extract. The malt extract thus prepared is heated up to 40° to 70° C. and saccharified by incubating with starch hydrolase for 1.5 to 4 hours. Then, the saccharified malt extract is heated again up to the boiling point, i.e., 90° to 105° C., and left to stand for 2 to 10 minutes and to chill down to 65° to 75° C. The saccharified solution is, in turn, filtrated, and to the filtrate is added 7 to 15 wt % of white sugar to bring the total sugar content to Brix value between 32 and 68. Preferably, 2 to 4 wt % of malt is added and 0.001 to 0.1 wt % of starch hydrolase such as $\alpha$- and $\beta$-amylases is employed in this step; and, 0.05 to 0.3 wt % of ginger, a flavor enhancer, is further added to the saccharified malt extract under heating. Impurities in the malt extract solution are removed, if necessary.

Step 2: Preparation of nectaring rice and saccharification 3 wt % of nonglutinous rice is washed with water two or three times to remove impurities, and steeped in water and boiled for one hour to gelatinize, and then left to stand to yield nectaring rice. One to three times of water by weight maintained at a temperature between 40° and 70° C. is added to the nectaring rice together with starch hydrolase and incubated under a temperature between 40° and 70° C. for 1.5 to 4 hours to saccharify the rice. Then, the saccharified nectaring rice is collected and washed with water. Preferably, $\alpha$-amylase and $\beta$-amylase of 0.01 to 0.1 wt % each are employed as starch hydrolases.

Step 3: Filling-up

The malt extract saccharified in Step 1 is diluted with water so that the solution's sugar content ranges from Brix 10 to 14, and mixed with the nectaring rice saccharified in Step 2. Then, the resulting rice nectar is filled up in a proper container and sealed under vacuum condition.

Step 4: Retorting

The rice nectar in a container of Step 3 is put in a retort chamber and sterilized under a pressure of 1.2 to 1.5 kg/cm$^2$ and a temperature of 110° to 125° C. for 10 to 30 minutes, preferably, for 13 to 25 minutes. In this step, pathogenic microorganisms in raw materials or contaminated in manufacturing processes, especially spore-forming bacteria, such as Bacillus and Clostridium which do not live longer than 5 to 6 minutes at 120° C., can be completely eliminated by being subjected to said temperature for 10 to 30 minutes, preferably, for 13 to 25 minutes. After retorting, the instant rice nectar can be preserved for more than 12 months.

The process for preparing an instant rice nectar of the invention is schematically depicted in FIG. 1.

The present invention is further illustrated in the following examples, which should not be taken to limit the scope of the invention.

EXAMPLE 1

To prepare 10 kg of instant rice nectar, 2.5 kg of water was placed in a mixer and maintained at 30° C. Then, to the water, 300 g of malt was added and stirred for 1 hour under a temperature of 30° C., and filtrated to obtain malt extract. The malt extract thus produced was heated up to 55° C., and saccharified by incubating with 1 g of $\alpha$- and $\beta$-amylases under the same temperature for two hours while stirring. Saccharified malt extract was then heated up to 100° C. and boiled for 7 minutes, and then chilled down to the temperature of 70° C. At the moment, the impurities in the upper part of the solution was removed. The saccharified solution was filtered using a sieve of 50 μm pore in diameter and white sugar was added to the filtrate so that the total sugar content reaches Brix 48.

300 g of nonglutinous rice was washed with water twice to remove impurities and poured in water, and boiled for one hour to gelatinize, and then left to stand to give nectaring rice. To the nectaring rice thus obtained, 600 g of water maintained at a temperature of 55° C. and 5 g each of α- and β-amylases were added, and the mixture was incubated for two hours at 55° C. to saccharify the nectaring rice. Then, the saccharified nectaring rice was collected and washed with water.

Malt extract obtained after saccharification was diluted with water so that the sugar content reaches Brix 12, and then mixed with the saccharified nectaring rice. The resulting rice nectar was filled up in a container and sealed. The container filled with rice nectar was, in turn, put in a retort chamber and sterilized under a condition of 1.4 kg/cm$^2$ of pressure and 120° C. of temperature for 20 minutes. Finally, the rice nectar was chilled down to room temperature to yield the instant rice nectar of the invention.

EXAMPLE 2

Instant rice nectar was prepared in the same manner as in Example 1, with an exception of adding 10 g of ginger to the saccharified malt extract under heating.

Evaluation of preservation and taste of the rice nectar

Preservation and taste of rice nectars prepared in Examples 1 and 2 and conventional Shikhye of prior art were evaluated with varying the storage time at 20° C. Specifically, the evaluation was carried out by a 9-point hedonic scale method with 30 panels in total, of which the results were shown in FIG. 1.

TABLE 1

Evaluation of preservation and taste of the instant rice nectars

| Storage Time | Rice Nectar | Evaluation Items | |
|---|---|---|---|
| | | Putrefaction | Taste |
| 0 day | Example 1 | No | 8.0 |
| | Example 2 | No | 8.1 |
| | Prior Art | No | 7.0 |
| 5 days | Example 1 | No | 7.9 |
| | Example 2 | No | 8.0 |
| | Prior Art | Yes | — |
| 1 month | Example 1 | No | 7.9 |
| | Example 2 | No | 8.0 |
| | Prior Art | Yes | — |

TABLE 1-continued

Evaluation of preservation and taste of the instant rice nectars

| Storage Time | Rice Nectar | Evaluation Items | |
|---|---|---|---|
| | | Putrefaction | Taste |
| 3 months | Example 1 | No | 7.8 |
| | Example 2 | No | 7.9 |
| | Prior Art | Yes | — |
| 6 months | Example 1 | No | 7.7 |
| | Example 2 | No | 7.8 |
| | Prior Art | Yes | — |
| 12 months | Example 1 | No | 7.3 |
| | Example 2 | No | 7.5 |
| | Prior Art | Yes | — |

As shown in Table 1 above, it was determined that the instant rice nectars of the invention are preserved over 12 months and retain their own delicious taste and characteristic flavor exceeding the hedonic scale of point 5.

As clearly illustrated and explained above, the present invention provides a novel process for preparing instant rice nectar in a massive manner, in which the process is greatly simplified by raising the efficiency of saccharifying malt extract and nectaring rice. The instant rice nectar of the invention can be preserved for a long time, while maintaining its own delicious taste and characteristic flavor.

What is claimed is:

1. A process for preparing an instant rice nectar which comprises the steps of:

(i) adding water to malt while stirring, filtrating to obtain malt extract, adding enzymes α-amylase and β-amylase to the malt extract and saccharifying for at least 1.5 hours, heating and chilling, filtering and adding sugar to the filtrate so that the total sugar content reaches Brix 32 to 68;

(ii) steeping nonglutinous rice in water and boiling, adding 1 to 3 times of water by weight and enzymes α-amylase and β-amylase to the resulting nectar rice, and saccharifying for at least 1.5 hours and washing saccharified nectaring rice with water;

(iii) diluting said malt extract with water to bring the sugar content to Brix 10 to 14, adding said saccharified nectaring rice to the resulting mixture, and filling up a container with rice nectar thus produced and sealing; and, (iv) putting said container filled with rice nectar in a retort chamber and sterilizing.

2. The process of claim 1, wherein it further comprises a step of adding ginger to said saccharified malt extract under heating.

\* \* \* \* \*